United States Patent
Kunimoto (10) Patent No.: US 11,561,746 B2
(45) Date of Patent: Jan. 24, 2023

(54) TERMINAL APPARATUS AND NON-TRANSITORY COMPUTER-READABLE MEDIUM

(71) Applicant: BROTHER KOGYO KABUSHIKI KAISHA, Nagoya (JP)

(72) Inventor: Shintaro Kunimoto, Inazawa (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/507,724

(22) Filed: Oct. 21, 2021

(65) Prior Publication Data

US 2022/0129216 A1 Apr. 28, 2022

(30) Foreign Application Priority Data

Oct. 27, 2020 (JP) .............................. JP2020-179585

(51) Int. Cl.
G06F 3/12 (2006.01)

(52) U.S. Cl.
CPC .......... *G06F 3/1229* (2013.01); *G06F 3/1204* (2013.01); *G06F 3/1238* (2013.01); *G06F 3/1294* (2013.01)

(58) Field of Classification Search
CPC .... G06F 3/1229; G06F 3/1204; G06F 3/1238; G06F 3/1294
USPC ....................................................... 358/1.15
See application file for complete search history.

(56) References Cited

U.S. PATENT DOCUMENTS

| 8,977,714 B2* | 3/2015 | Shima ................... G06F 21/606 709/227 |
| 9,131,082 B2* | 9/2015 | Otsuka .................. G06F 3/1293 |
| 2016/0216925 A1* | 7/2016 | Mizuta .................. G06F 3/1203 |

FOREIGN PATENT DOCUMENTS

| JP | H7-248889 A | 9/1995 |
| JP | H10-222318 A | 8/1998 |
| JP | 2001-34563 A | 2/2001 |
| JP | 2004-5002 A | 1/2004 |

* cited by examiner

*Primary Examiner* — Allen H Nguyen
(74) *Attorney, Agent, or Firm* — Kenealy Vaidya LLP (57) ABSTRACT

A terminal apparatus including: a communication interface configured to communicate with an information processing apparatus; and a controller configured to: detect a status change indicating that a specific change has occurred in a status of the terminal apparatus; based on detecting the status change, transmit a first notification to the information processing apparatus via the communication interface, the first notification not including change information indicating the detected status change; receive a response transmitted from the information processing apparatus, the response being transmitted based on the information processing apparatus receiving the first notification; and based on receiving the response, transmit a second notification to the information processing apparatus via the communication interface, the second notification including the change information.

19 Claims, 7 Drawing Sheets

TERMINAL APPARATUS AND NON-TRANSITORY COMPUTER-READABLE MEDIUM

CROSS-REFERENCE TO RELATED APPLICATIONS

This application is based on and claims priority under 35 USC 119 from Japanese Patent Application No. 2020-179585 filed on Oct. 27, 2020, the contents of which are incorporated herein by reference.

TECHNICAL FIELD

The present disclosure relates to technology of managing a terminal apparatus.

BACKGROUND

A related-art printing apparatus transmits state information to a higher-level apparatus when a state change of the printing apparatus is detected.

SUMMARY

One illustrative aspect of the present disclosure provides a terminal apparatus including: a communication interface configured to communicate with an information processing apparatus; and a controller configured to: detect a status change indicating that a specific change has occurred in a status of the terminal apparatus; based on detecting the status change, transmit a first notification to the information processing apparatus via the communication interface, the first notification not including change information indicating the detected status change; receive a response transmitted from the information processing apparatus, the response being transmitted based on the information processing apparatus receiving the first notification; and based on receiving the response, transmit a second notification to the information processing apparatus via the communication interface, the second notification including the change information.

In the terminal apparatus configured as described above, when the status change is detected, the change information is not immediately transmitted and the first notification is first transmitted. When the response to the first notification is received from the information processing apparatus, the second notification including the change information is transmitted. The description "the response to the first notification is received" means that there is the information processing apparatus and it is in a state where it is possible to appropriately communicate with the information processing apparatus.

Accordingly, the second notification is transmitted after confirming the response to the first notification, so that it is possible to transmit the second notification promptly and appropriately to the information processing apparatus while suppressing useless transmission of the second notification. Specifically, it is possible to promptly notify the information processing apparatus that the status change has occurred in the terminal apparatus, while appropriately maintaining the security regarding the status change.

Another illustrative aspect of the present disclosure provides a non-transitory computer-readable medium storing a computer program readable by a computer of an information processing apparatus, the information processing apparatus including a communication interface configured to communicate with a terminal apparatus, the terminal apparatus being configured to: based on detecting a status change in the terminal apparatus, transmit a first notification, the first notification not including change information indicating the detected status change; and based on receiving a response to the first notification, transmit a second notification including the change information, the computer program, when executed by the computer, causing the information processing apparatus to perform: receiving the first notification; based on receiving the first notification, transmitting the response to the terminal apparatus; and receiving the second notification, the second notification being transmitted based on the response.

According thereto, the information processing apparatus may receive appropriately and promptly the second notification while suppressing the useless transmission of the second notification from the terminal apparatus. Specifically, the information processing apparatus may promptly obtain that the status change has occurred in the terminal apparatus, while appropriately maintaining the security regarding the status change.

Still another illustrative aspect of the present disclosure provides a non-transitory computer-readable medium storing a computer program readable by a computer of a terminal apparatus, the terminal apparatus including a communication interface configured to communicate with an information processing apparatus, the computer program, when executed by the computer, causing the terminal apparatus to perform: detecting a status change indicating that a specific change has occurred in a status of the terminal apparatus; based on detecting the status change, transmitting a first notification to the information processing apparatus via the communication interface, the first notification not including change information indicating the detected status change; receiving a response transmitted from the information processing apparatus, the response being transmitted based on the information processing apparatus receiving the first notification; and based on receiving the response, transmitting a second notification to the information processing apparatus via the communication interface, the second notification including the change information.

BRIEF DESCRIPTION OF THE DRAWINGS

Illustrative embodiments of the disclosure will be described in detail based on the following figures, wherein.

DETAILED DESCRIPTION

If the state information is transmitted unilaterally, a security issue regarding the state information may arise, irrespective of whether there is a higher-level apparatus or whether it is in a state where it is possible to communicate with the higher-level apparatus.

Therefore, one illustrative aspect of the present disclosure promptly notifies an apparatus of a notification destination that a status has changed in a terminal apparatus, while appropriately maintaining security regarding the change in status.

Hereinafter, an exemplary illustrative embodiment of the present disclosure will be described with reference to the drawings.

1. Illustrative Embodiment (1-1) Outline of Terminal Management System

Figure 1:
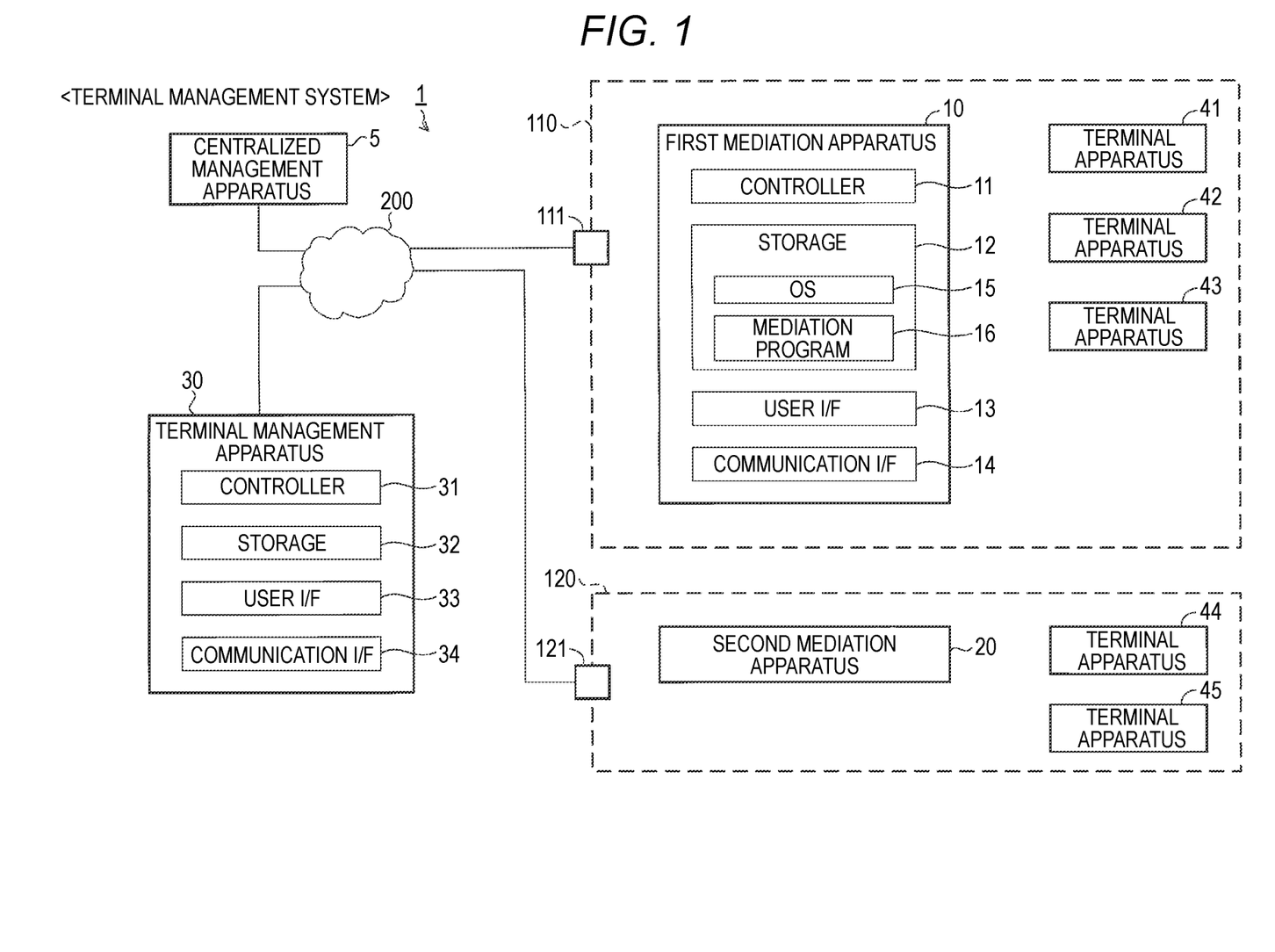
FIG. 1 shows a schematic configuration of a terminal management system of an illustrative embodiment.

A terminal management system 1 shown in FIG. 1 includes a centralized management apparatus 5, a terminal management apparatus 30, and at least one managed system. Each of the managed systems includes a mediation apparatus.

In the present illustrative embodiment, the terminal management system 1 includes, for example, two managed systems. Specifically, the terminal management system 1 includes a first managed system 110 and a second managed system 120, as shown in FIG. 1.

The first managed system 110 includes a first mediation apparatus 10. The first managed system 110 further includes one or more terminal apparatuses. In the present illustrative embodiment, the first managed system 110 includes, for example, three terminal apparatuses 41, 42 and 43. In the present illustrative embodiment, each of the terminal apparatuses 41 to 43 cannot directly communicate with any of the centralized management apparatus 5 and the terminal management apparatus 30 but can communicate with the first mediation apparatus 10.

The second managed system 120 includes a second mediation apparatus 20. The second managed system 120 further includes one or more terminal apparatuses. In the present illustrative embodiment, the second managed system 120 includes, for example, two terminal apparatuses 44 and 45. In the present illustrative embodiment, each of the terminal apparatuses 44 and 45 cannot directly communicate with any of the centralized management apparatus 5 and the terminal management apparatus 30 but can communicate with the second mediation apparatus 20.

Each of the terminal apparatuses 41 to 45 can be configured in any manner. Each of the terminal apparatuses 41 to 45 may be configured to be easily portable or may be configured not to be easily portable on the assumption that the terminal apparatus is installed to be used.

In the present illustrative embodiment, each of terminal apparatuses 41 to 45 is, for example, a small terminal apparatus that can be easily portable. More specifically, each of terminal apparatuses 41 to 45 of the present illustrative embodiment has, for example, a printer function. The printer function is a function of recording an image based on image data on a recording sheet (recording medium). At least one of the terminal apparatuses 41 to 45 may further have a scan function. The scan function is a function of reading an image recorded on a document to generate image data indicative of the read image.

The centralized management apparatus 5 and the terminal management apparatus 30 are connected to a global network 200, and can communicate with each other via the global network 200. The global network 200 may be any network, and in the present illustrative embodiment, is the Internet configured to perform communication in accordance with so-called TCP/IP (which is an abbreviation of Transmission Control Protocol/Internet Protocol) protocols. Each of the centralized management apparatus 5 and the terminal management apparatus 30 may be connected to the global network 200 via a router (not shown) having a firewall function.

The first managed system 110 includes a first local network (not shown). The first local network may be a so-called intranet. The first mediation apparatus 10 and each of the terminal apparatuses 41 to 43 are connected to the first local network. The first mediation apparatus 10 and each of the terminal apparatuses 41 to 43 can communicate with each other via the first local network.

The first local network may be a wired network, a wireless network or may be a network where the wired network and the wireless network coexist. In the present illustrative embodiment, the first local network is configured to perform communication in accordance with communication protocols including TCP/IP protocols, for example. More specifically, the first local network of the present illustrative embodiment is, for example, a so-called wireless LAN (which is an abbreviation of Local Area Network) based on standards of IEEE 802.11.

The first managed system 110 further includes a first relay apparatus 111. The first relay apparatus 111 is connected to the global network 200 and the first local network, and is configured to relay communication between the global network 200 and the first local network. The first mediation apparatus 10 can communicate with the terminal management apparatus 30 via the first relay apparatus 111.

The first relay apparatus 111 may have a so-called broadband router function. The first relay apparatus 111 may also have a firewall for limiting access from the global network 200 to the first managed system 110.

The second managed system 120 is basically configured in a similar manner to the first managed system 110. Specifically, the second mediation apparatus 20 is basically configured in a similar manner to the first mediation apparatus 10. The second managed system 120 also includes a second local network (not shown). The second local network may be a network that is the same type as the first local network, or may be a network that is different from the first local network. The second managed system 120 further includes a second relay apparatus 121. The second relay apparatus 121 has a function similar to the first relay apparatus 111. The second mediation apparatus 20 can communicate with the terminal management apparatus 30 via the second relay apparatus 121.

Note that, in descriptions below, when simply referring to 'terminal apparatus', it indicates each of the terminal apparatuses 41 to 45. Also, when simply referring to 'managed system', it indicates each of the first managed system 110 and the second managed system 120. Also, when simply referring to 'mediation apparatus', it indicates each of the mediation apparatus 10 and the second mediation apparatus 20.

The terminal management system 1 includes a part of a so-called mobile device management system (MDM system). Specifically, the centralized management apparatus 5 is possessed by a first company that provides a service of the MDM system, for example. On the other hand, the terminal management apparatus 30, the first mediation apparatus 10 and the second mediation apparatus 20 are possessed by a second company that wants to manage each of the terminal apparatuses 41 to 45 by using the MDM system, for example. The first mediation apparatus 10 may be provided at a first branch office of the second company, for example, and the second mediation apparatus 20 may be provided at a second branch office of the second company, for example.

The centralized management apparatus 5 performs communication with mobile terminals (not shown) of diverse management targets in the MDM system, thereby it is possible to manage the mobile terminals. It is one of basic functions in the MDM system that the centralized management apparatus 5 manages the mobile terminals by performing communication with the mobile terminals.

The centralized management apparatus 5 of the present illustrative embodiment can further manage a terminal apparatus with no function of directly communicating with the centralized management apparatus 5. Specifically, an administrator of the terminal apparatus can manage the terminal apparatus in the managed system by accessing the managed system (specifically, accessing the mediation apparatus) from the centralized management apparatus 5 via the terminal management apparatus 30.

The administrator can manage the terminal apparatus by accessing a site for management of the centralized management apparatus 5 by using a Web browser, for example. Specifically, the administrator can confirm a status of the terminal apparatus by accessing the site for management, for example. Also, for example, the administrator can request an action from the terminal apparatus via the site for management.

In addition, the administrator can manage the terminal apparatus in the similar manner to the above by directly accessing the terminal management apparatus 30 without via the centralized management apparatus 5. For example, the administrator can manage the terminal apparatus by accessing the site for management of the terminal management apparatus 30 via a user I/F 33 (which will be described later) of the terminal management apparatus 30 or by using the Web browser. Note that, 'I/F' is an abbreviation of 'interface'.

(1-2) Configuration of Terminal Management Apparatus

As shown in FIG. 1, the terminal management apparatus 30 includes a controller 31, a storage 32, a user I/F 33 and a communication I/F 34.

The controller 31 includes, for example, a CPU (which is an abbreviation of Central Processing Unit). The storage 32 includes, for example, a semiconductor memory such as a ROM (which is an abbreviation of Read Only Memory), a RAM (which is an abbreviation of Random Access Memory), an NVRAM (which is an abbreviation of Non-Volatile Random Access Memory), a flash memory and an SSD (which is an abbreviation of Solid State Drive). Specifically, the terminal management apparatus 30 includes a computer having a CPU and a semiconductor memory. The storage 32 may also have a memory different from the semiconductor memory, such as a hard disk drive. In the storage 32, a variety of programs, data, and the like including an operating system, a Web server, a terminal management program and a management database (hereinafter, referred to as 'management DB') are stored.

The controller 31 is configured to execute a program stored in the storage 32, thereby implementing diverse functions. Note that, a variety of functions implemented by the controller 31 are not limited to the configuration where they are implemented by the execution of the program. For example, some or all of the functions may also be implemented using one or a plurality of hardware.

The management DB includes management information for each of terminal apparatuses registered as management targets (hereinafter, referred to as 'registered terminal'). The management information includes an IP address, a serial number, a model name, affiliation information, status information, version information of firmware and the like of the registered terminal. The model name indicates a model type of the terminal apparatus.

The affiliation information is information for specifying a mediation apparatus with which the registered terminal is associated. The terminal management apparatus 30 is configured to identify and register each of the registered terminals, based on which mediation apparatus is used for managing each registered terminal. In the present illustrative embodiment, the terminal apparatuses 41 to 43 are each associated with the first mediation apparatus 10, and the terminal apparatuses 44 and 45 are each associated with the second mediation apparatus 20.

The serial number is an inherent number allotted to each terminal apparatus for specifying the terminal apparatus. The serial number may be, for example, a MAC address (abbreviation of Media Access Control address) or a specific number.

The status information may include, for example, any information indicative of a status of the terminal apparatus. The status information may include at least one of a variety of setting values set in the terminal apparatus, a remaining amount of a battery 56 (which will be described later), information indicating whether the remaining amount of the battery is smaller than a first threshold value, a remaining amount of a recording sheet, information indicating whether the recording sheet is exhausted, a count value of printed sheets, information indicating whether the count value of printed sheets has reached a second threshold value, information indicating an opened/closed state of a cover (not shown), location information indicating a place where the terminal apparatus exists, and a user name of the terminal apparatus. The location information and the user name may also be manually input to the terminal apparatus by the administrator. The variety of setting values may include, for example, fonts, font sizes, concentrations, image qualities, recording sheet sizes, a printing history, a remaining amount of a coloring agent and the like that are used in the printer function.

The user I/F 33 includes an input device such as a keyboard and a mouse for receiving a variety of inputs of the administrator. The user I/F 33 further includes, for example, a display device such as a liquid crystal panel and an LED (abbreviation of Light Emitting Diode) display device for displaying a variety of information for the administrator.

The communication I/F 34 is an interface for communicating with the centralized management apparatus 5, each of the mediation apparatuses 10 and 20, and the like. The communication I/F 34 may also be, for example, an interface of a wired LAN, a wireless LAN, and other diverse communications. In the present illustrative embodiment, the communication I/F 34 is connected to the global network 200.

(1-3) Configuration of Mediation Apparatus

In the present illustrative embodiment, the first mediation apparatus 10 and the second mediation apparatus 20 have the same configuration. Therefore, hereinafter, the first mediation apparatus 10 is described. As shown in FIG. 1, the first mediation apparatus 10 includes a controller 11, a storage 12, a user I/F 13 and a communication I/F 14.

The controller 11 includes, for example, a CPU. The storage 12 includes, for example, a semiconductor memory such as a ROM, a RAM, an NVRAM, a flash memory and an SSD. Specifically, the first mediation apparatus 10 includes a computer having a CPU and a semiconductor memory. The storage 12 may also have a memory different from the semiconductor memory, such as a hard disk drive. In the storage 12, a variety of programs, data and the like including an OS (abbreviation of Operating System) 15, a mediation program 16 and a registered terminal list are stored.

The controller 11 is configured to execute a program stored in a non-transitory tangible recording medium, thereby implementing diverse functions. In the present illustrative embodiment, the storage 12 corresponds to the non-transitory tangible recording medium having a program stored thereon. Note that, a variety of functions implemented by the controller 11 are not limited to the configuration where they are implemented by the execution of the program. For example, some or all of the functions may also be implemented using one or a plurality of hardware.

The registered terminal list includes information for specifying the registered terminals associated with the first mediation apparatus 10. In the present illustrative embodiment, the registered terminal list includes, for example, the serial numbers of the associated registered terminals.

Figure 7:
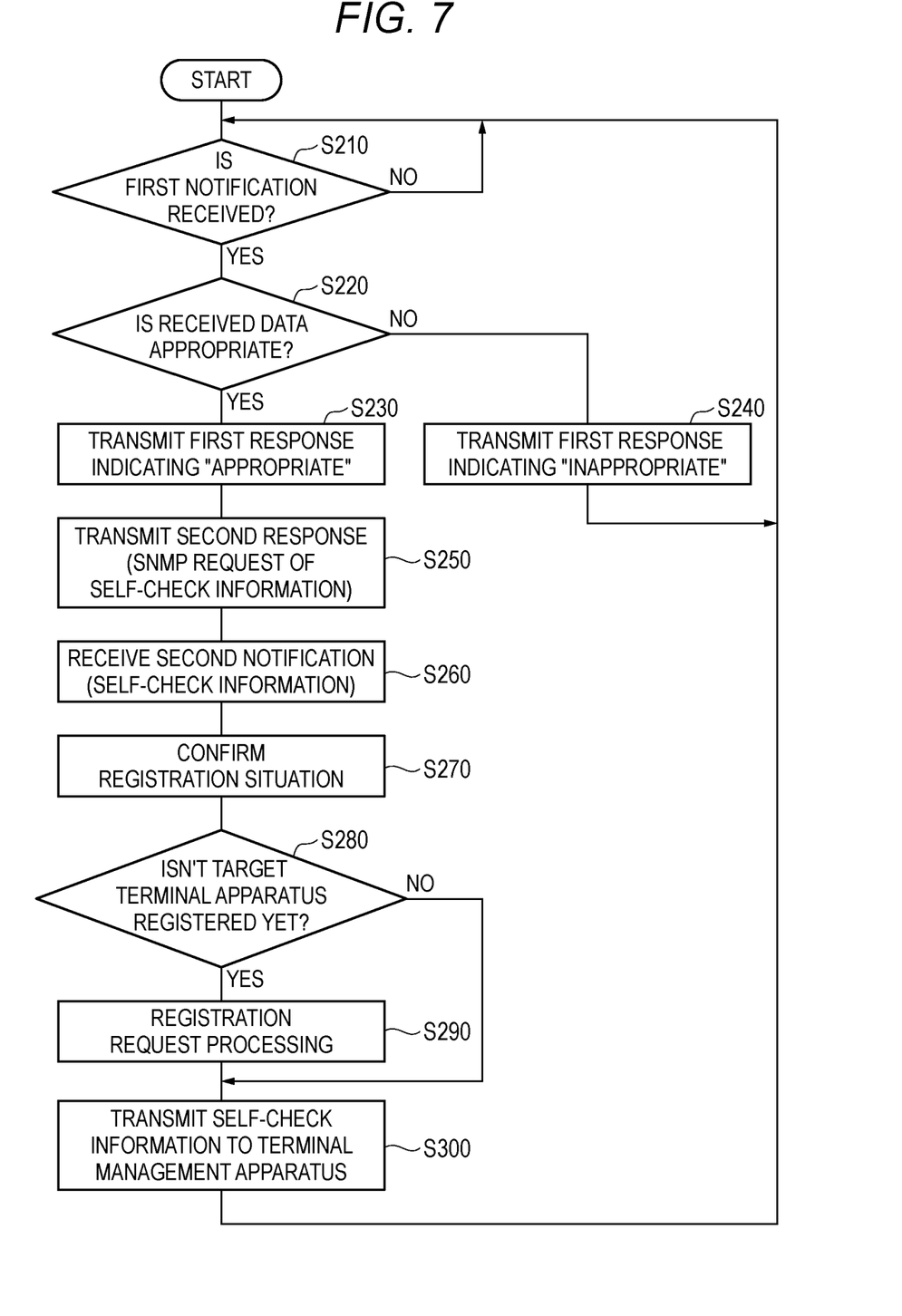
FIG. 7 is a flowchart of self-check monitoring processing that is executed in a mediation apparatus of the illustrative embodiment.

The mediation program 16 includes a variety of processing for mediating management of the terminal apparatus by the centralized management apparatus 5 or the terminal management apparatus 30. Self-check monitoring processing shown in FIG. 7 is included in the mediation program 16.

The mediation program 16 may be provided with being pre-installed in the first mediation apparatus 10. The mediation program 16 may also be provided with being stored in a storage medium such as a CD-ROM (abbreviation of Compact Disk Read Only Memory), a DVD-ROM (abbreviation of Digital Versatile Disk Read Only Memory), a USB (abbreviation of Universal Serial Bus) memory and a flash memory, and then installed in the first mediation apparatus 10 by reading out the mediation program 16 from the storage medium. The mediation program 16 may also be downloaded and installed in the first mediation apparatus 10 via an Internet communication line.

In descriptions below, a main body (for example, the controller 11 of the first mediation apparatus 10) executing the program may also be simply referred to as a program name. For example, the description 'the mediation program 16' may also mean 'the controller 11 configured to execute the mediation program 16'.

The user I/F 13 includes an input device such as a keyboard and a mouse for receiving a variety of inputs of the administrator. The user I/F 13 further includes, for example, a liquid crystal panel, an LED display device and the like.

The communication I/F 14 is an interface for communicating with the terminal management apparatus 30, each of the terminal apparatuses 41 to 43, and the like. The communication I/F 14 may also include, for example, an interface of a wired LAN, a wireless LAN, Bluetooth, a USB, and other diverse communications. The first mediation apparatus 10 is configured to communicate with each apparatus connected to the global network 200, including the terminal management apparatus 30, via the firewall of the first relay apparatus 111.

(1-4) Configuration of Terminal Apparatus

Subsequently, a configuration of each of the terminal apparatuses 41 to 45 is described. In the present illustrative embodiment, since each of the terminal apparatuses 41 to 45 has the same configuration, the terminal apparatus 41 is described below with reference to FIG. 2.

Figure 2:
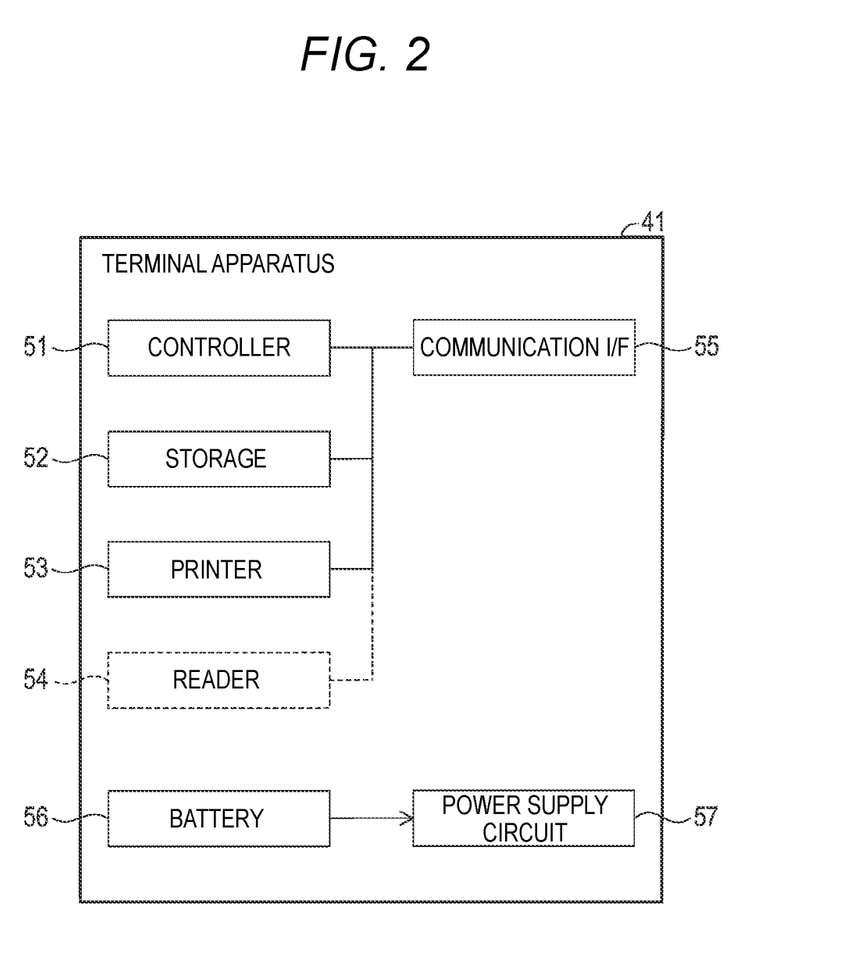
FIG. 2 shows a schematic configuration of a terminal apparatus of the illustrative embodiment.

The terminal apparatus 41 includes a controller 51, a storage 52, a printer 53, a communication I/F 55, a battery 56 and a power supply circuit 57. The terminal apparatus 41 may further include a reader 54.

The controller 51 includes, for example, a CPU. The storage 52 includes, for example, a semiconductor memory such as a ROM, a RAM, an NVRAM, a flash memory and an SSD. Specifically, the terminal apparatus 41 includes a computer having a CPU and a semiconductor memory. In the storage 52, a variety of programs, data and the like are stored.

The controller 51 is configured to execute a program stored in a non-transitory tangible recording medium, thereby implementing diverse functions. In the present illustrative embodiment, the storage 52 corresponds to the non-transitory tangible recording medium having a program stored thereon. Note that, a variety of functions implemented by the controller 51 are not limited to the configuration where they are implemented by the execution of the program. For example, some or all of the functions may also be implemented using one or a plurality of hardware.

In the storage 52, an IP address, a serial number, a model name and the like of the terminal apparatus 41 are stored. In the storage 52, a program for self-check processing of FIG. 6, which will be described later, is further stored.

The printer 53 is configured to implement the printer function. The reader 54 is configured to implement the scan function.

The communication I/F 55 is an interface for communicating with the terminal management apparatus 30 and the first mediation apparatus 10. The communication I/F 55 may include, for example, at least one of an interface for performing communication by a wireless LAN, an interface for performing communication by a wired LAN, an interface for performing communication by Bluetooth (a registered trademark of Bluetooth SIG, Inc.), and an interface for performing communication by a USB (abbreviation of Universal Serial Bus). The terminal apparatus 41 may be configured to communicate with the first mediation apparatus 10 via any interface.

The power supply circuit 57 is configured to generate and output at least one type of a power supply voltage from electric power of the battery 56. Each component in the terminal apparatus 41 is configured to operate by the at least one type of the power supply voltage generated by the power supply circuit 57. The battery 56 may be a primary battery or a secondary battery that can be repeatedly charged. Note that, the terminal apparatus 41 may also be configured to operate by receiving electric power supplied from a power supply different from the battery 56.

(1-5) Management Function

Figure 3:
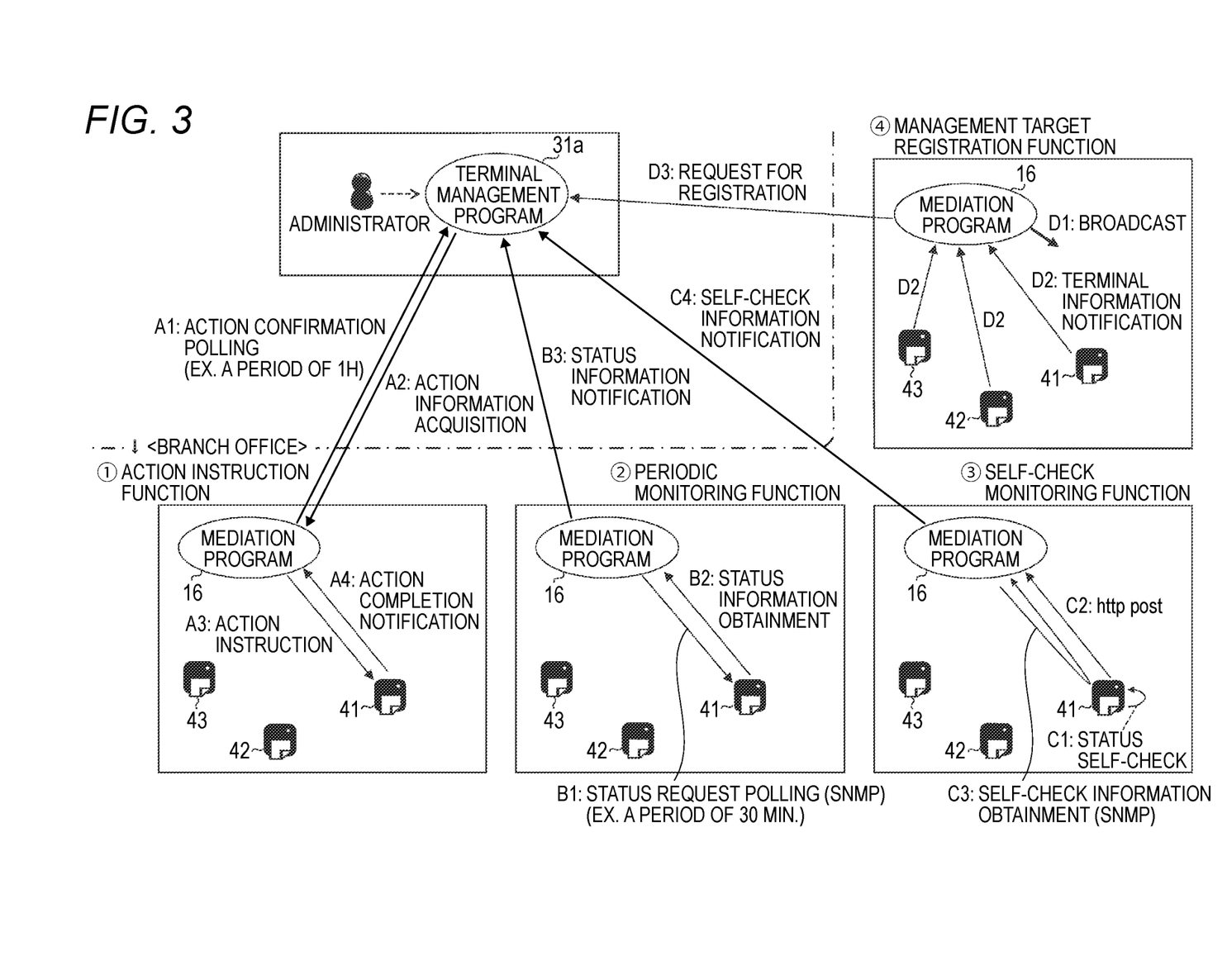
FIG. 3 schematically shows four functions of the terminal management system of the illustrative embodiment.

The terminal management system 1 of the present illustrative embodiment mainly has four types of management functions schematically shown in FIG. 3. Specifically, the terminal management system 1 has an action instructing function, a periodic monitoring function, a self-check monitoring function and a terminal registering function. In the below, the four types of management functions are specifically described. Note that, in the four types of functions, the processing that is executed by the mediation apparatus is basically implemented by the controller 11 executing the mediation program 16. Also, the processing that is executed by the terminal management apparatus 30 is basically implemented by the controller 31 executing the above terminal management program. The processing that is executed in the terminal apparatus is also basically implemented by executing the program installed in the terminal apparatus.

(1-5-1) Action Instruction Function

The action instructing function is a function of requesting one or more types of actions from a terminal apparatus of an instruction target (hereinafter, referred to as 'action target terminal'), thereby causing the action target terminal to execute an action.

The one or more types of actions may include, for example, at least one of an update instruction for various setting values, an update instruction for firmware, a download instruction for a file, and a request for status information transmission. The action instructing function may also include an action instruction to the mediation apparatus. For example, one of actions may be to request, to the mediation apparatus, a broadcast for searching for a terminal apparatus present around the mediation apparatus (in other words, a terminal apparatus present in the same managed system as the mediation apparatus).

An example of an execution procedure of the action instruction function is described with reference to FIG. 3.

(1-5-1-a) Action Registration on Terminal Management Apparatus

The administrator can designate one or more of the terminal apparatuses 40 to 45 as the action target terminal and register an action on the terminal management apparatus 30 directly or via the centralized management apparatus 5.

In the storage 32 of the terminal management apparatus 30, an action table is stored. The action table includes information indicative of the registered action. The action registered in the action table may be deleted from the action table as the action is executed.

The terminal management apparatus 30 of the present illustrative embodiment does not actively access the mediation apparatus by itself. The main reason is because the access to the inside of the managed system is interrupted by the firewall of each of the relay apparatuses 111 and 121. Accordingly, the terminal management apparatus 30 does not request the registered action by itself.

(1-5-1-b) Action Confirmation Polling from Mediation Apparatus

As shown with 'A1' in FIG. 3, the mediation program 16 periodically transmits an action confirming polling to the terminal management apparatus 30. The action confirming polling is a polling for confirming whether an action is registered in the terminal management apparatus 30. The action confirming polling is performed using an HTTP (Hypertext Transfer Protocol), for example.

The action confirming polling includes identification information (for example, serial numbers) for specifying all the registered terminals belonging to the managed system to which the mediation apparatus belongs. Note that, one action confirming polling does not have to include the identification information of all the registered terminals. For example, the action confirming polling may be sequentially performed individually for each of one or more registered terminals. The action confirming polling may be transmitted at any timing. The action confirming polling may be transmitted periodically (for example, every hour).

(1-5-1-c) Action Information Provision from Terminal Management Apparatus

When the action confirming polling is received from the mediation apparatus, the terminal management apparatus 30 confirms whether there is an action corresponding to the registered apparatus indicated by the identification information included in the action confirming polling. When it is confirmed that the corresponding action is registered, the terminal management apparatus 30 receiving the action confirming polling associates and transmits action information indicative of the action with the corresponding registered terminal (i.e., action target terminal) to the mediation apparatus, as shown with 'A2' in FIG. 3.

The association between the action information and the registered terminal may be made in any manner as long as it is possible to identify which registered terminal the action information is for. In the present illustrative embodiment, for example, the IP address of the registered terminal is added to the action information.

(1-5-1-d) Action Instruction Based on Action Information

When the action information is obtained from the terminal management apparatus 30, the mediation apparatus issues an action instruction to the action target terminal associated with the action information, as shown with 'A3' in FIG. 3. Specifically, the mediation apparatus instructs the action target terminal to execute an action indicated by the action information. In the present illustrative embodiment, as described above, the IP address of the corresponding action target terminal is added to the action information. Accordingly, the mediation apparatus accesses the action target terminal based on the IP terminal, and instructs an action indicated by the action information.

(1-5-1-e) Action Execution by Terminal Apparatus

When the action instruction is received from the mediation apparatus, the action target terminal executes an action indicated by the action instruction. After executing the action, the action target terminal transmits, to the mediation apparatus, an action completing notification indicating that the action has been normally executed, as shown with 'A4' in FIG. 3. The action completion notification may include information indicative of an execution result of the executed action. Specifically, for example, the action completion notification may include status information of the action target terminal after execution of the action.

When the action completing notification is received from the terminal apparatus, the mediation apparatus notifies the terminal management apparatus 30 that the action has been normally executed. This notification may also include the information indicative of the execution result of the action. Thereby, the administrator can obtain the information about the execution of the action and the execution result of the action by accessing any one of the centralized management apparatus 5 and the terminal management apparatus 30.

(1-5-2) Periodic Monitoring Function

The periodic monitoring function is a function that the mediation apparatus periodically obtains the status information from the registered terminal and transmits the same to the terminal management apparatus 30. When the status information is received, the terminal management apparatus 30 updates the management DB based on the status information. Thereby, the administrator can confirm the latest status of the registered terminal by accessing any one of the centralized management apparatus 5 and the terminal management apparatus 30 to refer to the management DB.

An example of an execution procedure of the periodic monitoring function is described with reference to FIG. 3.

(1-5-2-a) Periodic Polling by Mediation Apparatus

As shown with 'B1' in FIG. 3, the mediation apparatus polls a status request to each of the registered terminals belonging to the mediation apparatus. The status request polling includes an instruction to request the status information.

In the present illustrative embodiment, the status request polling is a so-called SNMP polling that is performed in accordance with SNMP (Simple Network Management Protocol) protocol, for example. Note that, as for SNMP, there are version 1 (SNMPv1), version 2 (SNMPv2) and version 3 (SNMPv3). The status request polling may be performed in accordance with any version of SNMP but is performed, in the present illustrative embodiment, in accordance with SNMPv3 having the highest security level. This also applies to an SNMP request shown with 'C3' in FIG. 3. SNMPv3 has a password authentication function for each user, an access control function capable of defining a range of accessible MIB (Management Information Base) for each user, and the like.

The status request polling may be performed at any timing. The status request polling may be performed with a constant period (for example, every 30 minutes). In addition, the mediation apparatus may not perform the polling for all the registered terminals each time. Specifically, for example, whenever the execution timing of the polling comes, the terminal apparatus of the polling target may be sequentially switched one by one or by a predetermined number.

(1-5-2-b) Transmission of Status Information from Terminal Apparatus

In the storage 52 of the terminal apparatus, MIB that is used for SNMP protocol is preserved. The terminal apparatus receiving the status request polling to the terminal apparatus transmits some or all of the status information preserved in the MIB to the mediation apparatus, as shown with 'B2' in FIG. 3.

(1-5-2-c) Status Information Notification to Terminal Management Apparatus

When the status information is received from the terminal apparatus, the mediation apparatus transmits the status information to the terminal management apparatus 30, as shown with 'B3' in FIG. 3. When the status information is received, the terminal management apparatus 30 updates the 'management database' based on the status information.

(1-5-3) Self-Check Monitoring Function

The self-check monitoring function is a function that the terminal apparatus itself monitors a status and notifies a status change to the mediation apparatus when the status change is detected. The status change to be detected includes at least one of a plurality of phenomena such as a phenomenon that a remaining amount of the battery decreases by a predetermined level, a phenomenon that the remaining amount of the battery falls below a first threshold value, a phenomenon that a recording sheet is exhausted, a phenomenon that a print count reaches a second threshold value, a phenomenon that the cover is changed from a closed state to an opened state, a phenomenon that a location is changed, and a phenomenon that a user name is changed. The phenomenon that the remaining amount of the battery decreases by a predetermined level means each time the remaining amount of the battery decreases by a prescribed percentage from a prescribed initial value (for example, a remaining amount upon full-charge). Specifically, when the prescribed percentage is 10%, it is determined that the status change has occurred each time the remaining amount of the battery decreases by 10% such as 90%, 80%, 70% and the like of the prescribed initial value.

An example of an execution procedure of the self-check monitoring function is described with reference to FIG. 3.

(1-5-3-a) Self-Check in Terminal Apparatus

The terminal apparatus has a self-check function. The self-check function is a function of periodically (for example, with a constant period) checking a status (refer to 'C1' in FIG. 3). The self-check function further includes determining whether a status change has occurred, based on a check result.

(1-5-3-b) Transmission of Status Information Based on Detection of Status Change When the terminal apparatus detects a status change, the terminal apparatus transmits self-check information to the mediation apparatus. The self-check information includes information by which it is possible to recognize at least the latest status after change. Specifically, the self-check information includes, for example, at least one of information indicative of the detected status change and information indicative of a status that has changed. The self-check information may further include information indicative of a status different from the status whose change has been detected. Specifically, the self-check information may be the same kind as the status information that is transmitted by the terminal apparatus in the periodic monitoring function.

However, in the present illustrative embodiment, when the terminal apparatus detects the status change, the terminal apparatus does not immediately transmit the self-check information. In the present illustrative embodiment, the terminal apparatus that detects the status change performs a series of communications with the mediation apparatus (which will be described later; refer to 'C2' to 'C3' in FIG. 3) and then transmits the self-check information to the mediation apparatus. The series of communications will be described later.

(1-5-3-c) Transmission of Status Information from Mediation Apparatus to Terminal Management Apparatus When the self-check information is received from the terminal apparatus, the mediation apparatus transmits the self-check information to the terminal management apparatus 30, as shown with 'C4' in FIG. 3.

When the self-check information is received, the terminal management apparatus 30 updates the 'management database' based on the self-check information. Thereby, the administrator can confirm the latest status of each of the registered terminals.

(1-5-4) Terminal Registering Function

The terminal registering function is a function that the mediation apparatus searches for the terminal apparatus present in the managed system including the mediation apparatus, transmits the terminal information about the searched terminal apparatus to the terminal management apparatus 30 for requesting registration of the terminal apparatus and causes the terminal management apparatus 30 to register the terminal apparatus as a management terminal.

Note that, in a case where the mediation apparatus has the information about the registered terminal and can determine a registration situation of the terminal apparatus, the mediation apparatus may transmit only the terminal information about a terminal apparatus, which is not registered among searched terminal apparatuses, to the terminal management apparatus 30 for requesting registration thereof.

An example of an execution procedure of the terminal registering function is described with reference to FIG. 3.

(1-5-4-a) Broadcast by Mediation Apparatus

As shown with 'D1' in FIG. 3, the mediation apparatus performs broadcast for searching for the terminal apparatus. Specifically, when the broadcast is received, the mediation apparatus is to request the terminal apparatus to transmit the terminal information thereof. The requested terminal information includes at least information capable of specifying the terminal apparatus itself. Specifically, the terminal information may include, for example, a serial number, a model name and an IP address. The terminal information may also include the status information.

The broadcast may be performed periodically, for example. The broadcast may also be performed with a constant period (for example, every 30 minutes).

(1-5-4-b) Response by Terminal Apparatus

The terminal apparatus receiving the broadcast transmits the terminal information to the mediation apparatus, as shown with 'D2' in FIG. 3. Thereby, the mediation apparatus can perceive the terminal apparatus present in the managed system to which the mediation apparatus belongs.

(1-5-4-c) Request for Registration to Terminal Management Apparatus

The mediation apparatus obtaining the terminal information based on the broadcast transmits a request for registration including the terminal information to the terminal management apparatus 30, as shown with 'D3' in FIG. 3. Thereby, a terminal apparatus not registered is newly registered in the management DB of the terminal management apparatus 30.

(1-6) Details of Self-Check Monitoring Function

Subsequently, the self-check monitoring function of the present illustrative embodiment is described in more detail with reference to FIGS. 3 and 4.

As described above, the terminal apparatus periodically executes self-check on a status by the self-check function. When the status change is detected, the terminal apparatus transmits a first notification to the mediation apparatus by an 'HTTP POST' request, as shown with 'C2' in FIG. 3 and FIG. 4. The first notification does not include the self-check information. The 'HTTP POST' request is one of transmission methods prescribed in the HTTP protocols.

Figure 5:
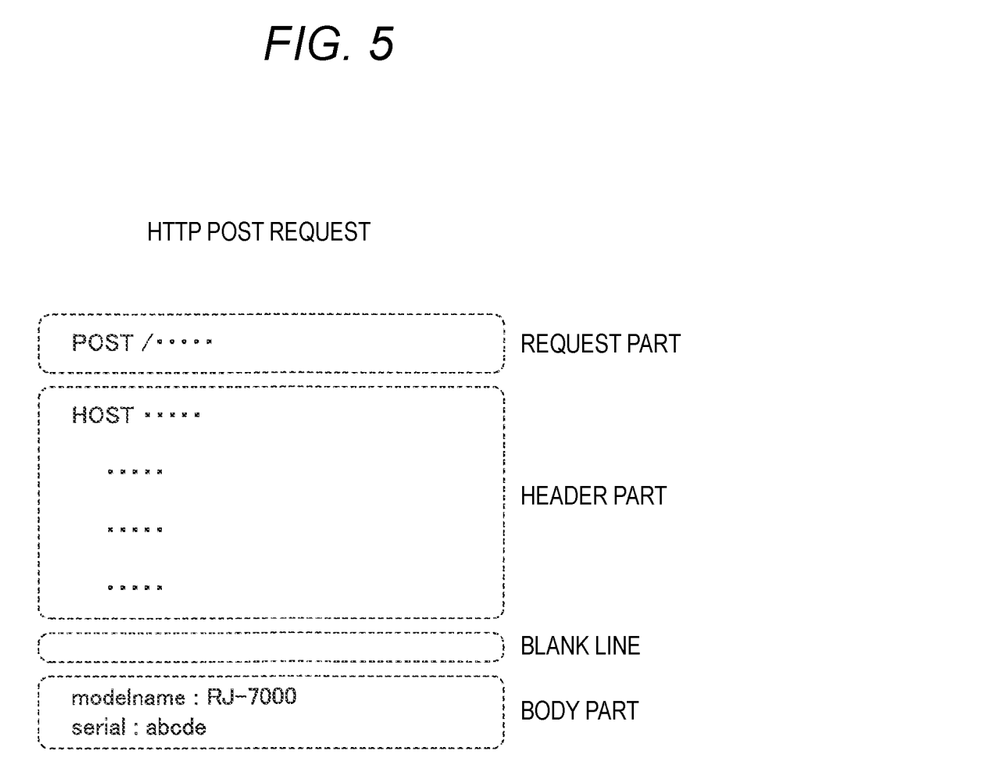
FIG. 5 shows an example of an HTTP POST request of the illustrative embodiment.

FIG. 5 shows an example of a schematic configuration of the 'HTTP POST' request. As shown in FIG. 5, the 'HTTP POST' request has a request part, a header part, a blank line part, and a body part. The request part starts from 'POST/' indicative of 'HTTP POST'. The body part includes data to be transmitted. In the first notification of the present illustrative embodiment, a model name and a serial number are included in the body part, in an order shown in FIG. 5.

Figure 4:
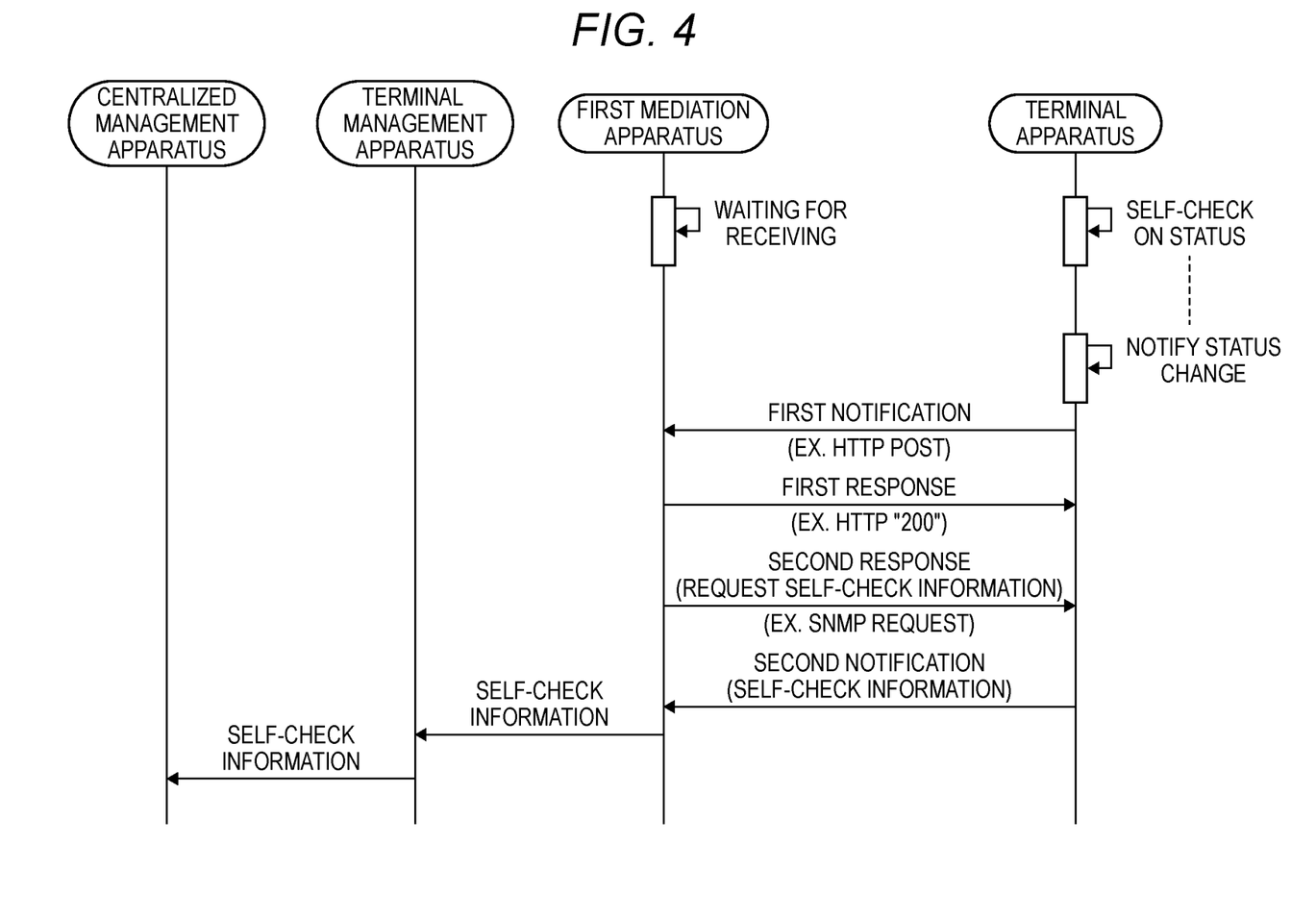
FIG. 4 is a sequence diagram showing an execution example of a self-check monitoring function of the illustrative embodiment.

As exemplified in FIG. 4, when activated, the mediation apparatus periodically waits for reception of the first notification from the terminal apparatus, for example. When the first notification is received from the terminal apparatus, the mediation apparatus requests and obtains the self-check information from the terminal apparatus, as shown with 'C3' in FIG. 3. Specifically, as shown in FIG. 4, the medication apparatus first transmits a first response to the terminal apparatus.

A content of the first response is different depending on whether the appropriate first notification is received. The mediation apparatus determines whether the received first notification is appropriate. Whether the first notification is appropriate may be determined based on any determination standard. In the present illustrative embodiment, for example, whether the first notification is appropriate is determined based on whether a data structure of the body part is appropriate. Specifically, for example, whether the first notification is appropriate is determined based on whether a model name and a serial number are included in a regular order in the body part.

When it is determined that the first notification is appropriate, the mediation apparatus transmits the first response including an HTTP status code '200' to the terminal apparatus, as exemplified in FIG. 4. When it is determined that the first notification is not appropriate, the mediation apparatus transmits the first response including an HTTP status code '400' to the terminal apparatus. The HTTP status code is a code consists of three digits prescribed in HTTP, and '200' indicates that the first notification is appropriate, and '400' indicates that the first notification is inappropriate.

The mediation apparatus transmitting the first response subsequently transmits a second response to the terminal apparatus, as exemplified in FIG. 4. The second response requests the self-check information from the terminal apparatus. The second response is transmitted by a protocol having a higher security level than the first notification from the terminal apparatus.

There are a variety of protocols having a higher security level than 'HTTP POST'. In the present illustrative embodiment, the second response is transmitted using the SNMP protocol having an authentication function that is not provided in 'HTTP POST'. More specifically, in the present illustrative embodiment, for example, the second response including an SNMP request based on SNMPv3 is transmitted to the terminal apparatus.

When the terminal apparatus transmitting the first notification receives the first response including the HTTP status code '400' and then the second response, the terminal apparatus transmits a second notification including the self-check information to the mediation apparatus.

As exemplified in FIG. 4, when the mediation apparatus receives the second notification from the terminal apparatus, the mediation apparatus transmits the self-check information included in the second notification to the terminal management apparatus 30. When the terminal management apparatus 30 receives the self-check information, the terminal management apparatus 30 updates the 'management database' based on the self-check information, as described above. The terminal management apparatus 30 may further transmit the received self-check information to the centralized management apparatus 5.

(1-7) Self-Check Processing in Terminal Apparatus

The self-check processing that is executed in the terminal apparatus so as to implement the self-check monitoring function is described with reference to FIG. 6.

Figure 6:
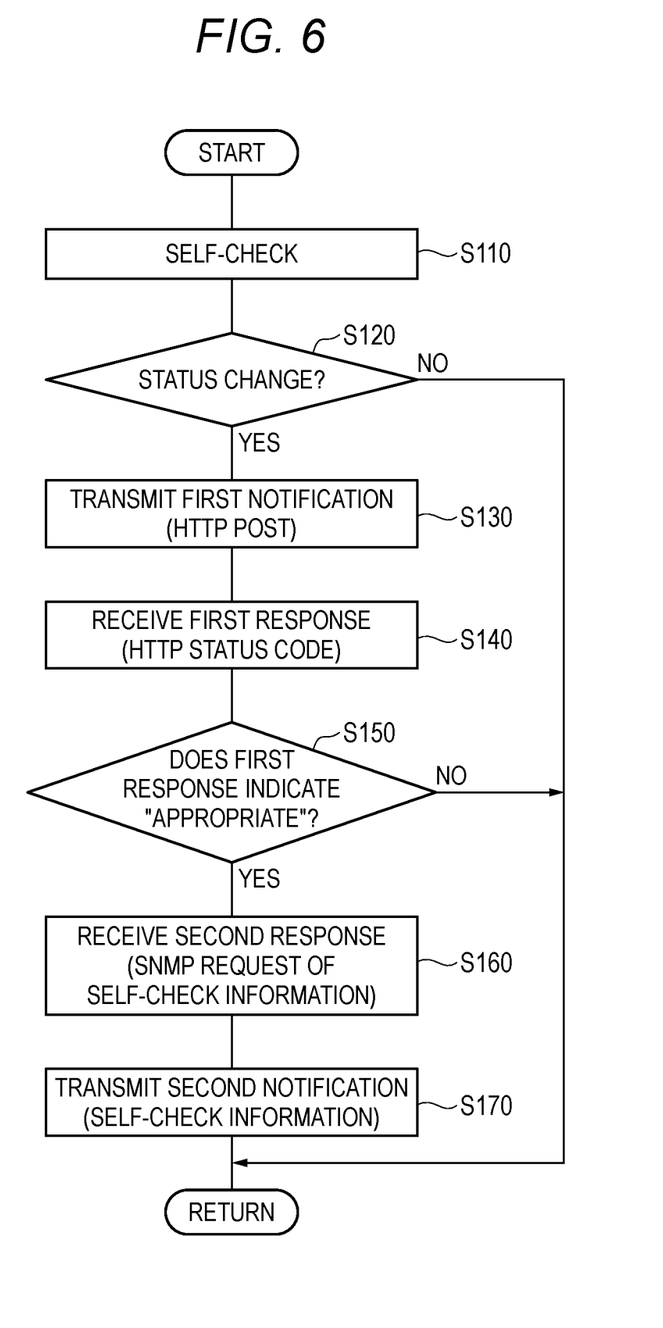
FIG. 6 is a flowchart of self-check processing that is executed in the terminal apparatus of the illustrative embodiment.

When activated, the controller 51 of the terminal apparatus reads out and periodically repeatedly executes a program of the self-check processing shown in FIG. 6 stored in the storage 52. When the self-check processing is started, the controller 51 executes the self-check on a status in S110. In S120, the controller determines whether the status change has occurred, based on a result of the self-check in S110. When the status change has not occurred, the self-check processing is over. When the status change has occurred, the controller proceeds to S130.

In S130, the controller transmits the first notification to the mediation apparatus. Specifically, the controller transmits the 'HTTP POST' request. In S140, the controller receives the first response that is transmitted from the mediation apparatus, based on the first notification. Specifically, the controller receives the HTTP status code.

In S150, the controller determines whether the first response received in S140 indicates 'appropriate'. Specifically, the controller determines that the first response indicates 'appropriate' when the first response includes the HTTP status code '200', and determines that the first response does not indicate 'appropriate' when the first response includes the HTTP status code '400'.

When it is determined in S150 that the first response does not indicate 'appropriate', the self-check processing is over. When it is determined in S150 that the first response indicates 'appropriate', the controller proceeds to S160.

In S160, the controller receives the second response transmitted from the mediation apparatus. Specifically, the controller receives the SNMP request requesting the status information. In S170, the controller transmits the second notification to the mediation apparatus. Specifically, the controller transmits the self-check information by the SNMP response to the SNMP request.

(1-8) Self-Check Monitoring Processing in Mediation Apparatus

The self-check monitoring processing that is executed in the mediation apparatus so as to implement the self-check monitoring function is described with reference to FIG. 7.

When activated, the controller 11 of the mediation apparatus reads out and executes a program of the self-check monitoring processing shown in FIG. 7 stored in the storage 12. When the self-check monitoring processing is started, the controller 11 periodically determines whether the first notification is received from the terminal apparatus, in S210. When the first notification is received, the controller proceeds to S220.

In S220, the controller determines whether the received first notification is appropriate. As described above, in the present illustrative embodiment, this determination is performed based on the body part of the 'HTTP POST' request, for example. When the received first notification is inappropriate, the controller proceeds to S240. In S240, the controller transmits the first response, which indicates that the first notification is inappropriate, to the terminal apparatus. Specifically, the controller transmits the first response including the HTTP status code '400' to the terminal apparatus.

When it is determined in S220 that the received first notification is appropriate, the controller proceeds to S230. In S230, the controller transmits the first response, which indicates that the first notification is appropriate, to the terminal apparatus. Specifically, the controller transmits the first response including the HTTP status code '200' to the terminal apparatus.

Subsequently to the transmission of the first response, the controller transmits the second response to the terminal apparatus in S250. Specifically, as described above, the controller transmits the SNMP request for requesting the self-check information from the terminal apparatus. In S260, the controller receives the second notification that is transmitted from the terminal apparatus, based on the second response. As described above, the second notification includes the self-check information.

In S270, the controller confirms a registration situation. In the present illustrative embodiment, the second notification transmitted from the terminal apparatus includes the terminal information capable of specifying the terminal apparatus, in addition to the self-check information. In S270, the controller determines whether the terminal apparatus has been already registered as a registered terminal, based on the terminal information. Specifically, for example, the controller may obtain the information about the registered terminal from the terminal management apparatus 30 and make the determination, based on the information. In addition, for example, the controller may determine whether the terminal apparatus is registered by transmitting the terminal information to the terminal management apparatus 30, causing the terminal management apparatus 30 to confirm whether the terminal apparatus is registered or not and by obtaining a result of the confirmation from the terminal management apparatus 30.

In S280, the controller determines whether the terminal apparatus, which is a transmission source of the second notification, is not registered, based on the confirmation result in S270. When the terminal apparatus has been already registered, the controller proceeds to S300. When the terminal apparatus has not been registered yet, the controller proceeds to S290. In S290, the controller executes registration request processing. Specifically, the controller transmits a request for registration to the terminal management apparatus 30, together with the terminal information, thereby causing the terminal management apparatus 30 to register the unregistered terminal apparatus. When the terminal apparatus is registered as the management target in the terminal management apparatus 30, a notification of registration completion is transmitted from the terminal management apparatus 30 to the mediation apparatus. When the notification is received, the processing proceeds to S300.

In S300, the controller transmits the self-check information received in S260 to the terminal management apparatus 30. After the processing of S300, the controller proceeds to S210.

(1-9) Advantageous Effects of Illustrative Embodiment

According to the above illustrative embodiment, the following effects (a) to (d) are realized.

(a) When the status change is detected, the terminal apparatus does not immediately transmit the self-check information and transmits the first notification. When the second response is received from the mediation apparatus, based on the first notification, the second notification including the self-check information is transmitted to the mediation apparatus. Specifically, after the terminal apparatus confirms that there is the mediation apparatus and it is in a state where it is possible to communicate with the mediation apparatus, the terminal apparatus transmits the self-check information to the mediation apparatus.

In this way, the second notification is transmitted after confirming the second response from the mediation apparatus, based on the first notification, so that it is possible to transmit the self-check information appropriately and promptly to the mediation apparatus while suppressing useless transmission of the self-check information. Specifically, it is possible to promptly notify the mediation apparatus that the status change has occurred in the terminal apparatus, while appropriately maintaining the security regarding the status change.

(b) The terminal apparatus transmits the first notification by the 'HTTP POST' request. In contrast, the mediation apparatus transmits the second response in accordance with the protocol having the higher security level than the protocol of the first notification. Specifically, the second response is transmitted in accordance with the SNMP protocol (more specifically, SNMPv3) having the higher security level than 'HTTP POST' and the authentication function.

Accordingly, the mediation apparatus can obtain the self-check information of the terminal apparatus while appropriately maintaining the security performance.

(c) The mediation apparatus can perceive the status change of the terminal apparatus more rapidly when the period of the status request polling of the periodic monitoring function is shortened, for example. Therefore, it can be said that the self-check monitoring function is not necessarily required, from a standpoint of rapidly perceiving the latest status when the period of the status request polling is set extremely short (for example, shorter than 1 second).

However, the terminal apparatus operates by the electric power of the battery 56. If the periodic polling for confirming a status is frequently performed with a short period, a response should be transmitted each time. Since the transmission of information requires a relatively large amount of electric power, if the response transmission is repeated with a short period, the battery 56 is rapidly consumed, which may be inconvenient for the administrator or the user of the terminal apparatus. From a standpoint of keeping the battery 56 for a long time, it is preferable that the periodic polling is performed with a long period as much as possible.

Therefore, in the present illustrative embodiment, the periodic polling is performed with a relatively long period (for example, every 30 minutes). Note that, in a case where the self-check monitoring function is provided separately from the periodic monitoring function and the status change occurs, the terminal apparatus issues a notification by itself. For this reason, the administrator can rapidly perceive the status change while suppressing the early consumption of the battery 56 of the terminal apparatus.

(d) Before transmitting the self-check information obtained from the terminal apparatus to the terminal management apparatus 30, the mediation apparatus confirms the registration situation of the terminal apparatus (S270). When the terminal apparatus is not registered yet, the mediation apparatus first registers the terminal apparatus as a management target and then transmits the self-check information. Accordingly, even when the self-check information is received from the terminal apparatus that is not registered yet, it is possible to appropriately manage the self-check information.

Here, the correspondence between the wording in the present disclosure and the wording in the present illustrative embodiment is supplementarily described. In the present illustrative embodiment, both the first mediation apparatus 10 and the second mediation apparatus 20 correspond to an example of the information processing apparatus of the present disclosure. The self-check information corresponds to an example of the change information of the present disclosure. The first threshold value corresponds to an example of the threshold value of the present disclosure. The printer 53 corresponds to an example of the recorder of the present disclosure.

S120 corresponds to an example of the detection processing in the terminal apparatus of the present disclosure. S130 corresponds to an example of the first transmission processing in the terminal apparatus of the present disclosure. S160 corresponds to an example of the receiving processing in the terminal apparatus of the present disclosure. S170 corresponds to an example of the second transmission processing in the terminal apparatus of the present disclosure. S210 corresponds to an example of the first receiving processing in the program of the present disclosure. S250 corresponds to an example of the first transmission processing in the program of the present disclosure. S260 corresponds to an example of the second receiving processing in the program of the present disclosure. S300 corresponds to an example of the second transmission processing in the program of the present disclosure. S270 to S280 correspond to an example of the registration determining processing in the program of the present disclosure. S290 corresponds to an example of the registration requesting processing in the program of the present disclosure.

2. Other Illustrative Embodiments

Although the illustrative embodiment of the present disclosure has been described, the present disclosure is not limited to the above illustrative embodiment and can be variously modified and implemented.

(2-1) In the self-check monitoring function, any status change may be set as the detection target. A status change different from the above status change based on the remaining amount of the battery, the remaining amount of the recording sheets, and the like may also be set as the detection target. The determination as to whether the status change has occurred may be performed based on any determination standard.

(2-2) In the above illustrative embodiment, the first notification, the first response, the second response and the second notification may be each transmitted using any communication protocol. The first notification, the first response, the second response and the second notification may be each transmitted using a communication protocol different from the above illustrative embodiment.

(2-3) The application of the present disclosure is not limited to the MDM system. Specifically, the present disclosure can also be applied to a terminal management system with no centralized management apparatus 5 and irrelevant to the MDM system.

(2-4) In the above illustrative embodiment, the plurality of functions of one composition element may be implemented by the plurality of composition elements, or one function of one composition element may be implemented by the plurality of composition elements. In addition, the plurality of functions of the plurality of composition elements may be implemented by one composition element, or one function that is implemented by the plurality of composition element may be implemented by one composition element. Further, some of the configurations of the above illustrative embodiment may be omitted. Further, at least some of the configurations of the above illustrative embodiment may be added or replaced with respect to the configurations of the other illustrative embodiments.

What is claimed is:

1. A terminal apparatus comprising:
   a communication interface configured to communicate with an information processing apparatus; and
   a controller configured to:
   detect a status change indicating that a specific change has occurred in a status of the terminal apparatus;
   based on detecting the status change, transmit a first notification to the information processing apparatus via the communication interface, the first notification not including change information indicating the detected status change;
   receive a response transmitted from the information processing apparatus, the response being transmitted based on the information processing apparatus receiving the first notification; and
   based on receiving the response, transmit a second notification to the information processing apparatus via the communication interface, the second notification including the change information.

2. The terminal apparatus according to claim 1,
   wherein in the transmitting of the first notification, the controller is configured to transmit the first notification in accordance with a first protocol, and
   wherein the first protocol comprises a POST request in HTTP.

3. The terminal apparatus according to claim 1,
   wherein in the transmitting of the first notification, the controller is configured to transmit the first notification in accordance with a first protocol, and
   wherein the information processing apparatus transmits the response in accordance with a second protocol having a higher security level than the first protocol.

4. The terminal apparatus according to claim 3,
   wherein the second protocol has an authentication function.

5. The terminal apparatus according to claim 1,
   wherein the first notification includes at least one of information for specifying the terminal apparatus and information indicating a model type of the terminal apparatus.

6. The terminal apparatus according to claim 1, further comprising a battery,
   wherein the status includes a remaining amount of the battery, and
   wherein the specific change corresponding to the remaining amount includes at least one of a change that the remaining amount decreases by a predetermined level and a change that the remaining amount falls below a threshold value.

7. The terminal apparatus according to claim 1,
   wherein the terminal apparatus is included in a terminal management system,
   wherein the terminal management system comprises:
   the terminal apparatus;
   the information processing apparatus; and
   a terminal management apparatus configured to manage the terminal apparatus via the information processing apparatus, and
   wherein the information processing apparatus is configured to, based on receiving the second notification from the terminal apparatus, transmit the change information included in the second notification to the terminal management apparatus.

8. The terminal apparatus according to claim 1,
   wherein the terminal apparatus comprises at least one of a recorder and a reader, the recorder being configured to record an image based on image data on a recording medium, and the reader being configured to read an image recorded on a document to generate image data indicative of the read image.

9. A non-transitory computer-readable medium storing a computer program readable by a computer of an information processing apparatus, the information processing apparatus comprising a communication interface configured to communicate with a terminal apparatus,
   the terminal apparatus being configured to:
   based on detecting a status change in the terminal apparatus, transmit a first notification, the first notification not including change information indicating the detected status change; and
   based on receiving a response to the first notification, transmit a second notification including the change information,
   the computer program, when executed by the computer, causing the information processing apparatus to perform:
   receiving the first notification;
   based on receiving the first notification, transmitting the response to the terminal apparatus; and
   receiving the second notification, the second notification being transmitted based on the response.

10. The non-transitory computer-readable medium according to claim 9,
    wherein the communication interface is further configured to communicate with a terminal management apparatus, the terminal management apparatus being configured to manage the terminal apparatus via the information processing apparatus, and
    wherein the computer program, when executed by the computer, further causes the information processing apparatus to perform:
    transmitting the change information to the terminal management apparatus, the change information being included in the received second notification.

11. The non-transitory computer-readable medium according to claim 10,
    wherein the computer program, when executed by the computer, further causes the information processing apparatus to perform:
    determining whether the terminal apparatus, which is a transmission source of the received second notification, is registered in the terminal management apparatus; and
    based on determining that the terminal apparatus is not registered in the terminal management apparatus, requesting the terminal management apparatus to register the terminal apparatus, and
    wherein the transmitting of the change information is performed after the requesting of the registration of the terminal apparatus.

12. A non-transitory computer-readable medium storing a computer program readable by a computer of a terminal apparatus, the terminal apparatus comprising a communication interface configured to communicate with an information processing apparatus, the computer program, when executed by the computer, causing the terminal apparatus to perform:
- detecting a status change indicating that a specific change has occurred in a status of the terminal apparatus;
- based on detecting the status change, transmitting a first notification to the information processing apparatus via the communication interface, the first notification not including change information indicating the detected status change;
- receiving a response transmitted from the information processing apparatus, the response being transmitted based on the information processing apparatus receiving the first notification; and
- based on receiving the response, transmitting a second notification to the information processing apparatus via the communication interface, the second notification including the change information.

13. The non-transitory computer-readable medium according to claim 12,
- wherein in the transmitting of the first notification, the computer program, when executed by the computer, causes the terminal apparatus to perform transmitting the first notification in accordance with a first protocol, and
- wherein the first protocol comprises a POST request in HTTP.

14. The non-transitory computer-readable medium according to claim 12,
- wherein in the transmitting of the first notification, the computer program, when executed by the computer, causes the terminal apparatus to perform transmitting the first notification in accordance with a first protocol, and
- wherein the information processing apparatus transmits the response in accordance with a second protocol having a higher security level than the first protocol.

15. The non-transitory computer-readable medium according to claim 14,
- wherein the second protocol has an authentication function.

16. The non-transitory computer-readable medium according to claim 12,
- wherein the first notification includes at least one of information for specifying the terminal apparatus and information indicating a model type of the terminal apparatus.

17. The non-transitory computer-readable medium according to claim 12,
- wherein the terminal apparatus further comprises a battery,
- wherein the status includes a remaining amount of the battery, and
- wherein the specific change corresponding to the remaining amount includes at least one of a change that the remaining amount decreases by a predetermined level and a change that the remaining amount falls below a threshold value.

18. The non-transitory computer-readable medium according to claim 12,
- wherein the terminal apparatus is included in a terminal management system,
- wherein the terminal management system comprises:
  - the terminal apparatus;
  - the information processing apparatus; and
  - a terminal management apparatus configured to manage the terminal apparatus via the information processing apparatus, and
- wherein the information processing apparatus is configured to, based on receiving the second notification from the terminal apparatus, transmit the change information included in the second notification to the terminal management apparatus.

19. The non-transitory computer-readable medium according to claim 12,
- wherein the terminal apparatus comprises at least one of a recorder and a reader, the recorder being configured to record an image based on image data on a recording medium, and the reader being configured to read an image recorded on a document to generate image data indicative of the read image.

* * * * *